United States Patent

Bachrach et al.

[11] Patent Number: 5,195,772
[45] Date of Patent: Mar. 23, 1993

[54] VALVE CONFIGURATION FOR CONVERTING AN ACTIVE SUSPENSION SYSTEM INTO A PASSIVE SUSPENSION SYSTEM

[75] Inventors: Benjamin I. Bachrach, Dearborn; Joel A. Levitt, Ann Arbor; John E. Nametz, Ypsilanti, all of Mich.

[73] Assignee: Ford Motor Company, Dearborn, Mich.

[21] Appl. No.: 717,295

[22] Filed: Jun. 18, 1991

[51] Int. Cl.$^5$ ............................................. B60G 11/26
[52] U.S. Cl. .................................... 280/707; 280/714
[58] Field of Search ......................... 280/707, 709, 714

[56] References Cited

U.S. PATENT DOCUMENTS

| | | |
|---|---|---|
| 3,884,496 | 5/1975 | Ito et al. |
| 4,462,610 | 7/1984 | Saito et al. |
| 4,625,994 | 12/1986 | Tanaka et al. |
| 4,693,493 | 9/1987 | Ikemoto et al. |
| 4,775,481 | 10/1988 | Allington |
| 4,779,895 | 10/1988 | Rubel ................................. 280/707 |
| 4,795,314 | 1/1989 | Prybella et al. |
| 4,807,128 | 2/1989 | Ikemoto et al. |
| 4,848,790 | 7/1989 | Fukunaga et al. |
| 4,858,895 | 8/1989 | Buma et al. |
| 4,919,440 | 4/1990 | Tsukamoto |
| 4,973,079 | 11/1990 | Tsukamoto |
| 4,973,080 | 11/1990 | Ikemoto et al. |
| 5,013,061 | 5/1991 | Fujimura et al. ................... 280/707 |
| 5,041,977 | 8/1991 | Kawabata ....................... 364/424.05 |
| 5,042,833 | 8/1991 | Kawabata ........................... 280/707 |

FOREIGN PATENT DOCUMENTS 3638574A 11/1986 Fed. Rep. of Germany.
3742883A 12/1987 Fed. Rep. of Germany.

*Primary Examiner*—Margaret A. Focarino
*Assistant Examiner*—Paul Dickson
*Attorney, Agent, or Firm*—Raymond L. Coppiellie; Roger L. May

[57] ABSTRACT

A vehicle suspension system having active and passive modes, comprising fluid providing means for providing a pressurized fluid, a cylinder, having at least two chambers, protection valve means having first and second states, for coupling the fluid providing means to the cylinder in the first state and uncoupling the fluid providing means from the cylinder in the second state, and by-pass valve means, having at least first and second states, being fluidly coupled to the cylinder and the protection valve means, for providing fluid communication therethrough between the chambers in the second state and not providing fluid communication therethrough between the chambers in the first state, and wherein the protection valve means is in the first state when the suspension system is in the active mode and the protection valve means and the by-pass valve means are in the second state when in the passive mode.

4 Claims, 3 Drawing Sheets

VALVE CONFIGURATION FOR CONVERTING AN ACTIVE SUSPENSION SYSTEM INTO A PASSIVE SUSPENSION SYSTEM

BACKGROUND OF THE INVENTION

The present invention relates to actively controlled suspension systems and, in particular, to an active suspension system having an active mode and a passive mode.

Active suspension systems are known to those skilled in the art. In general, active suspension systems control a vehicle's "ride" and "handling". Active suspension systems control and maintain a vehicle's attitude, for example, elevation, roll and pitch. Active suspension systems sense the attitude of the car and, in response, provide power to or remove power from actuators to maintain and control the "ride" and "handling" of the vehicle. For example, Williams et al., U.S. Pat. No. 4,625,993, teaches of a conventional active suspension system intended to maintain a vehicle substantially stable in all planes of movement irrespective of any external forces acting upon the vehicle.

Active suspension systems, for example in automobiles and the like, include a pressurized fluid source and suspension units. The pressurized fluid source, for example a hydraulic pump, provides fluid power in the form of a pressurized working fluid to suspension units at each vehicle wheel. The suspension units dissipate and/or counteract undesirable external forces.

The fluid power provided by the fluid source is critical to the performance of the active suspension system. The response of the active suspension system depends upon the suspension units having sufficient fluid power to dissipate and/or counteract undesirable external forces. When there is a system failure, for example an interruption in fluid communication between the pump and the suspension units, the system is unable to function in the active mode. Under these conditions, if the suspension system is to provide any suspension at all, the system will be required to function in a passive mode as a passive-like suspension system.

In addition to a loss of the active mode, an interruption in fluid communication between the pump and the suspension units can cause serious damage to various elements of the suspension system. The pump communicates with each of the suspension units through conduits, for example, a main conduit coupled to the pump and secondary conduits which "feed off" the main conduit and supply each suspension unit with the pressurized fluid. An interruption in fluid communication can result from a break in the main conduit which would lead to a complete loss of fluid in each of the suspension units. This could cause serious damage to various elements of the suspension units as well as the pump.

To prevent such damage and still provide suspension for the vehicle, suspension units have been proposed which include protection valves and by-pass valves. In suspension systems having double acting actuators, for example a cylinder having two chambers, in the event of a system failure, the protection valve fluidly isolates the suspension unit from the remaining suspension system. In doing so, the protection valve traps the pressurized fluid within the suspension unit. The by-pass valve then provides fluid communication between the two chambers. Further, the by-pass valve often provides some resistance to the flow of fluid between the two chambers. These valves have been employed in various configurations and can include supporting valves as well.

For example, active suspension systems like the system disclosed in West German patent DE 3638-574A employ a 3-port, two state, switching valve and a 4-port, two state, power valve. These valves are configured such that if there is a loss of fluid pressure or if there is an electrical power failure, the pump is disconnected from the suspension unit and a fluid restrictor is incorporated between the two chambers to provide resistance to fluid flow between the chambers. In this configuration, the suspension functions in a passive mode.

Active suspension systems like the system disclosed in DE 3638-574A employ a 3-port switching valve to both isolate the suspension unit and provide resistance to the flow of fluid when in the passive mode. The switching valve is pressure actuated and is responsive to the pressure of the fluid near the pump. Here the switching valve is responsive to the pressure of the fluid in the main pump fluid conduit instead of the pressure of the fluid in or approximate to the suspension unit.

Further, systems of this type incorporate the restricting portion within the fluid communication path in the passive mode only. These systems employ a fluid restrictor that, when interposed between the two chambers of the cylinder, provides a fixed resistance regardless of, for example, the current conditions of the road texture. The valve spool of the restrictor is set in a constant predetermined position—often when installed in the vehicle.

There exists a need for a valve configuration for converting an active suspension system into a passive suspension system having a protection valve to fluidly isolate the suspension unit and a separate by-pass valve to restrict fluid flow between the chambers of the cylinder. There exists a need for a by-pass valve that is fluidly coupled to the protection valve and the cylinder in both the active and passive modes while allowing restricted fluid flow therethrough when in the passive mode.

There exists a need for a valve configuration for converting an active suspension system into a passive suspension system having a protection valve which is pressure actuated and responsive to the pressure of the fluid in the suspension unit. Further, there exists a need for the by-pass valve having an adjustable fluid resistance which is set according to current suspension conditions, for example, according to the current "texture" of the road.

There exists a need for a protection valve that automatically isolates the suspension unit under conditions other than loss of supply pressure, for example a loss of electrical power and/or a malfunction of a control unit.

SUMMARY OF THE INVENTION

In a first principle aspect, the present invention is a vehicle suspension system having active and passive modes, comprising fluid providing means for providing a pressurized fluid, a cylinder, having at least two chambers, protection valve means having first and second states, for coupling the fluid providing means to the cylinder in the first state and uncoupling the fluid providing means from the cylinder in the second state, and by-pass valve means, having at least a first state, being fluidly coupled to the cylinder and the protection valve means, for providing fluid communication therethrough between the chambers in at least the first state, and wherein the protection valve means is in the first state when the suspension system is in the active mode and in the second state when the suspension system is in the passive mode and the by-pass valve means is in at least the first state when the suspension system is in the passive mode.

In another principle aspect of the invention, the protection valve means includes a pressure responsive switching means for switching the protection valve means between the first and second states in response to the pressure of the pressurized fluid.

In yet another principle aspect, the present invention is a valve configuration for a suspension unit, incorporated within a vehicle suspension system having active and passive modes and having a fluid source for providing a pressurized fluid, comprising protection valve means, having first and second states, for coupling the fluid source to the suspension unit in the first state and uncoupling the fluid source from the suspension unit in the second state and wherein the protection valve means includes a pressure responsive switching means for switching the protection valve means between the first and second states in response to a fluid pressure sufficient to switch the protection valve means. The protection valve configuration further includes protection valve actuating means, having first and second states, for fluidly coupling the pressurized fluid in the suspension unit to the switching means of the protection valve means in a first state and uncoupling the switching means from the pressurized fluid in a second state.

BRIEF DESCRIPTION OF THE DRAWINGS

In the course of the detailed description of preferred embodiments to follow, reference will be made to the attached drawings, in which.

DESCRIPTION OF THE PREFERRED EMBODIMENTS

Figure 1:
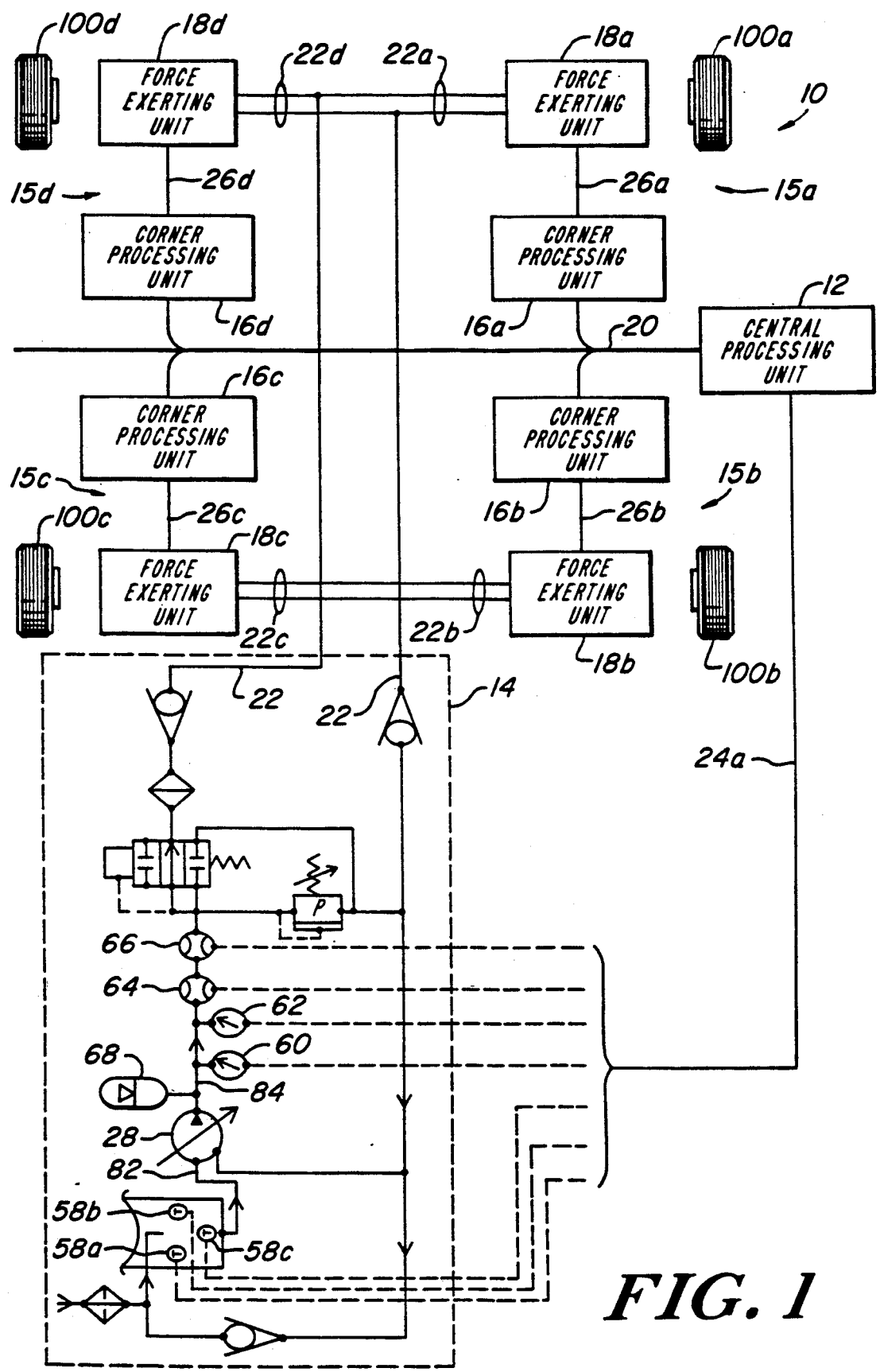
FIG. 1 is a functional schematic block diagram representation of a suspension system according to the present invention.

The schematic block diagram in FIG. 1 is an illustration of a suspension system 10 according to the present invention. The suspension system 10 employs a central processing unit 12 to coordinate the overall operation of the suspension system 10, including monitoring the various elements of suspension system 10 to detect a failure. Briefly, the suspension system 10 includes two separate nonmutually exclusive modes of operation, an active mode and a passive mode. When portions of the suspension system 10 are in the active mode, they function as an active suspension. When portions of the suspension system 10 are in the passive mode, they function much like a passive suspension. Some portions of the suspension system 10 may be functioning in the active mode when others are functioning in the passive mode.

In the illustrative embodiment, the suspension system 10 includes four suspension units 15a–d, one for each vehicle wheel 100a–d, respectively. When the suspension system 10 is in the active mode, the central processing unit 12 calculates and transmits a body force command to the suspension units 15a–d. The central processing unit 12 utilizes information from several accelerometers (not shown) and possibly other vehicle attitude sensors to generate the body force command. As is well known, the body force command is the suspension information required at each suspension unit 15a–d necessary to respond to accelerations of the vehicle body. In other embodiments, the central processing unit 12 sends actuator velocity commands to each suspension units 15a–d.

When the suspension system 10 is in the passive mode, it is functioning much like a conventional "shock absorber" type suspension system although it will become apparent, in view of the description below, that the central processing unit 12 has some control over the amount of force exerting and or damping provided by the suspension units 15a–d.

Each suspension unit 15a–d includes a corner processing unit 16a–d, respectively, which receive the body force command for its respective suspension unit 15a–d. The corner processing units 16a–d first calculate necessary modifications to the body force commands due to local conditions such as suspension position, suspension velocity or wheel acceleration. The corner processing units 16a–d then calculate, in response to the current conditions in force exerting units 18a–d, respectively, the adjustments necessary to achieve the exerting force required to meet the modified suspension command from the central processing unit 12. It should be noted, that the functions of the central processing unit 12 and the corner processing units 16a–d may be combined into a single processing unit.

The suspension units 15a–d further include force exerting units 18a–d, respectively. The force exerting units 18a–d respond to commands from the corner processing units 16a–d, respectively, in suppressing and/or counteracting forces acting on the vehicle body 98 so that the desired "ride" and "handling" behavior is substantially achieved. The corner processing units 16a–d communicate with the force exerting units 18a–d over multi-wires 26a–d, respectively.

The suspension units 15a–d, and in particular the force exerting units 18a–d, obtain fluid power from a fluid providing unit 14. The fluid providing unit 14 communicates with the force exerting units 18a–d via fluid conduits 22a–d, respectively.

The central processing unit 12 also monitors the suspension system 10 to detect failures in the fluid providing unit 14 and the suspension units 15a–d. When the central processing unit 12 detects a failure, it converts the suspension unit 15a–d affected into the passive mode. The central processing unit 12 communicates with the suspension units 15a–d over multi-wire bus 20. In a preferred embodiment, the multi-wire bus 20 is a 2-wire serial communication link. However, an optical communication link, or an optical or multi-wire parallel link, are acceptable alternatives.

The fluid providing unit 14 includes pump 28, a reservoir 58, fluid pressure sensors 60 and 62, fluid flow sensors 64 and 66, and a noise attenuator 68. The pump 28 may be of hydraulic or pneumatic type. In a preferred embodiment, the pump 28 is a hydraulic variable displacement pressure compensated unidirectional type pumping mechanism. In a preferred embodiment, the active suspension system 10 employs the pump 28 to provide hydraulic fluid at a substantially constant pressure. The pump 28, in a preferred embodiment, supplies the necessary flow rate to maintain the pressure of the fluid substantially constant at about 2500 psi in the fluid conduit 22.

The fluid pressure sensors 60 and 62 provide the central processing unit 12 with signals indicative of the fluid pressure of the fluid in the fluid conduit 22. The fluid flow sensors 64 and 66 provide the central processing unit 12 with signals indicative of the rate of fluid flow in the fluid conduit 22. Further, the reservoir 58 includes temperature sensors 58a and 58b which provides the central processing unit 12 with signals indicative of the temperature of the fluid in the reservoir 58. The reservoir 58 also includes a fluid level sensor 58c which provides the central processing unit 12 with a signal indicative of the level of the fluid in the reservoir 58. It should be noted that several of the sensors, for example, fluid flow sensors 64 and 66, are somewhat redundant and thus generate redundant information. The use of redundant sensors is not necessary to the proper operation of the system 10. The fluid providing unit 14, and in particular sensors 58a, 58b, 58c, 60, 62, 64, and 66, communicates with the central processing unit 12 over multi-wires 24.

Figure 2:
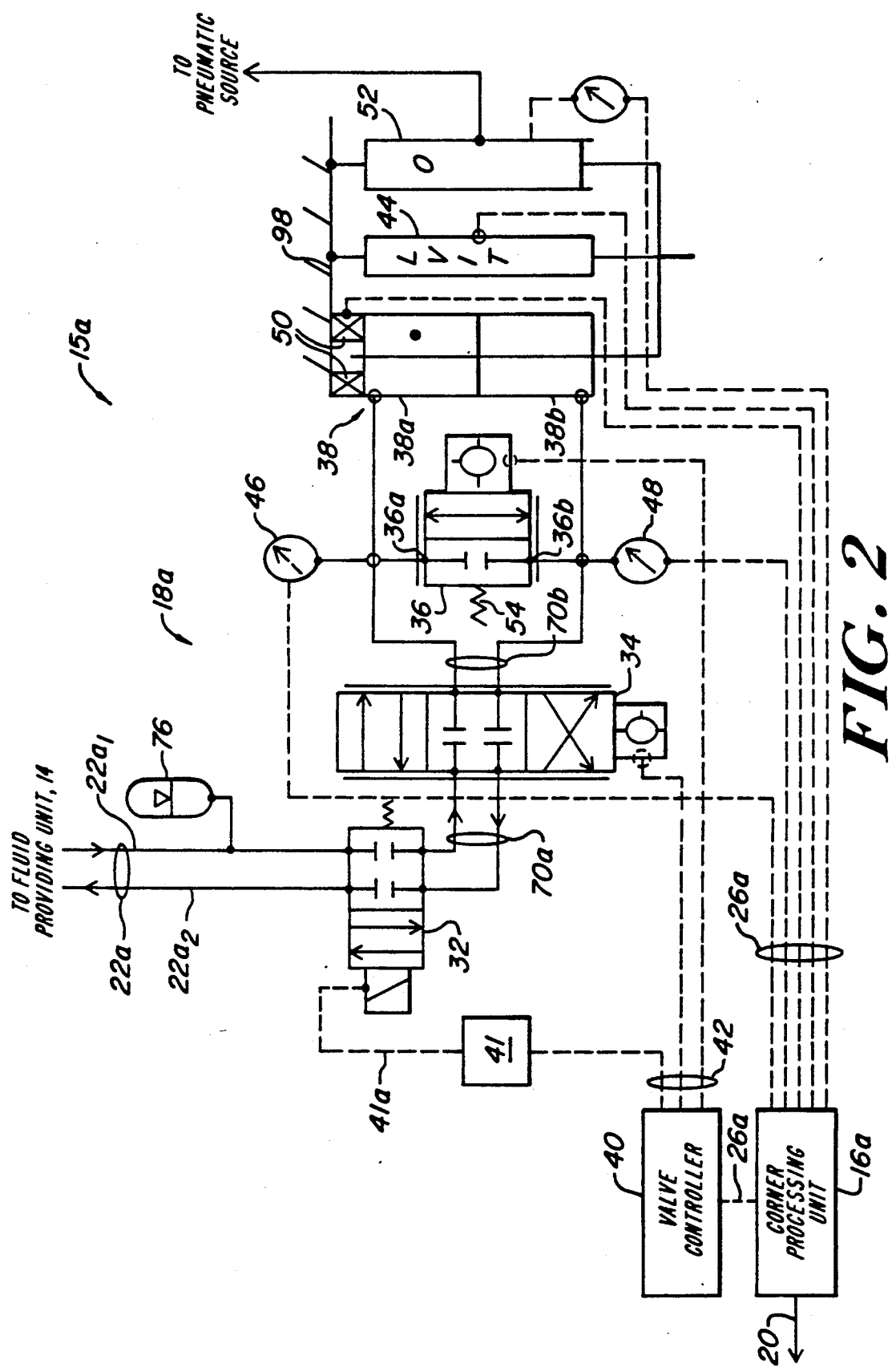
FIG. 2 is a detailed schematic representation of a preferred embodiment of the suspension unit of the suspension system of FIG. 1.
Figure 3:
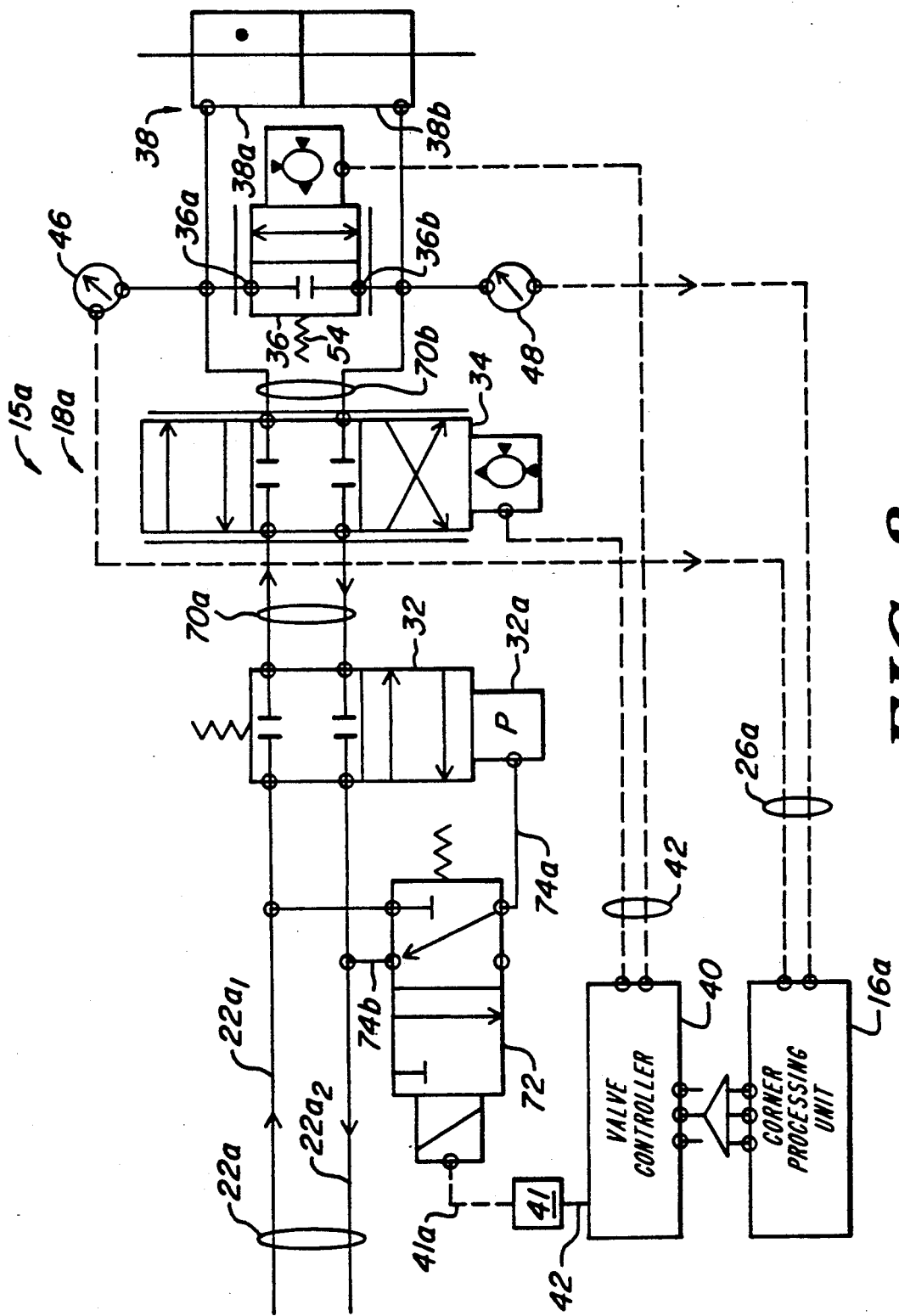
FIG. 3 is a detailed schematic representation of another preferred embodiment of the suspension unit of the suspension system of FIG. 1.

In preferred embodiments of FIGS. 1, 2, and 3, each suspension unit 15a–d is substantially identical in function. Each suspension unit 15a–d may vary to accommodate packaging or space constraints. Further, each suspension unit 15a–d may vary to provide a desired range of forces due to the vehicle weight distribution. FIGS. 2 and 3 provide a more detailed schematic representation of preferred embodiments of one of the suspension units 15a–d, particularly suspension unit 15a.

Referring now to FIG. 2, in a first preferred embodiment, force exerting unit 18a includes a protection valve 32, a power valve 34, a by-pass valve 36, a cylinder 38 having a first chamber 38a and a second chamber 38b, and an accumulator 76. The protection valve 32 is a 4-port electronically controlled, normally closed valve. It is well known that this means that there is no fluid communication through the valve unless it is actuated. The protection valve 32 is a two state device and in its actuated state, couples the fluid conduit 70a to conduit 22a to provide fluid communication between the pump 28 and the remaining elements of the force exerting unit 18a. The protection valve 32, in its unactuated state, uncouples the fluid conduit 70a from conduit 22a to interrupt fluid communication between the suspension unit 15a and the fluid providing unit 14. In the unactuated state, the protection valve 32 fluidly isolates the suspension unit 15a.

The power valve 34 is a 4-port electronically controlled, continuously adjustable, servo valve. The power valve 34 when actuated couples the fluid conduits 70a and 70b to provide fluid communication between the protection valve 32 and the chambers 38a and 38b of the cylinder 38. The power valve 34 is uncontrollable when the pressure of the fluid in conduit 22a is below some minimum pressure. Under these conditions, the power valve 34 may be in an indeterminate state. Thus, when the supply pressure is interrupted, the power valve 32 may not fluidly isolate the suspension unit 15a.

The by-pass valve 36 is a 2-port electronically controlled, continuously adjustable, servo valve. The by-pass valve 36 in its fully actuated state or closed state prohibits fluid communication through the valve between its valve ports 36a and 36b. The by-pass valve 36, when not in its fully actuated state, provides fluid communication through the valve between the chamber 38a and 38b of the cylinder 38 interposing adjustable flow resistance therebetween. The by-pass valve 36 is not incorporated within the fluid communication path in its completely actuated state. The by-pass valve 36 is coupled to fluid conduit 70b regardless of its state.

The by-pass valve 36, when not fully actuated or fully closed, functions as a fluid restrictor by restricting the fluid flow between the chambers 38a and 38b of the cylinder 38. In one embodiment, the by-pass valve 36 includes a spring mechanism 54 to force the valve spool of the by-pass valve 36 to a constant predetermined position when in the unactuated state or when control is not exerted by the corner processing unit 18a. The position of the valve spool inside the bushing of the valve 36 determines the diameter of the orifice incorporated in the valve path (between valve ports 36a and 36b). The resistance to fluid flow between the chambers 38a and 38b of the cylinder 38 is proportional to the area of the orifice diameter.

In another embodiment, the valve spool of the by-pass valve 36 is not forced into a constant predetermined position when in the unactuated state or when not in the actuated state. The position of the valve spool inside the bushing of the valve 36 is electronically adjustable thereby permitting the area of the orifice incorporated in the valve path (between valve ports 36a and 36b) to be adjusted by a remote means which is described below. Under these circumstances, the by-pass valve 36 functions as a proportional valve in permitting the amount of fluid restriction to be electronically adjusted.

The force exerting unit 18a also includes a valve controller 40 and a retriggerable monostable multivibrator unit 41. The valve controller 40 functions as an interface between the corner processing unit 16a and the force exerting unit 18a. The corner processing unit 16a provides valve control signals to the valve controller 40 which, in turn, controls the states of the valves. The corner processing unit 16a communicates with the valve controller 40 over multi-wires 26a. The power valve 34 and the by-pass valve 36 are responsive to signals from the valve controller 40. The valve controller 40 communicates with the power valve 34 and the by-pass valve 36 over multi-wires 42.

It should be noted that the function of the valve controller 40 may be fully incorporated within the corner processing unit 16a. Under these conditions, the corner processing unit 16a does not require a controller 40 to interface with the valves 32, 34, and 36.

The retriggerable monostable multivibrator unit 41 includes a retriggerable monostable multivibrator which provides an actuation signal to the protection valve 32. The actuation signal controls the state of the protection valve 32. The retriggerable monostable multivibrator unit 41 is triggered or retriggered by signals from the corner processing unit 16a via the valve controller 40. The monostable multivibrator unit 41 is triggered or retriggered at a sufficient frequency to insure the protection valve 32 remains actuated when the suspension unit 15a is in the active mode. The monostable multivibrator unit 41 communicates with the valve controller 40 over multi-wires 42 and with the protection valve 32 over wire 41a. The retriggerable monostable multivibrator unit 41 may be implemented employing an integrated circuit, for example, the 74122 series IC manufactured by Texas Instruments. The retriggerable monostable multivibrator unit 41 may also be implemented discretely from, for example, an operational amplifier, JFET, diode, resistor and capacitor network arranged in configurations known to those skilled in the relevant art.

In a preferred embodiment, the force exerting under unit 18a further includes a position transducer 44, pressure sensors 46 and 48, pressure transducer 50, for example a load cell, and a single acting pneumatic actuator 52. The position transducer 44, for example a linear variable inductor transducer, provides information which is indicative of the instantaneous position of the piston in the cylinder 38. The corner processing unit 16a communicates with the position transducer 44 over multi-wires 26a.

In operation, a suspension unit 15a reverts to, or is directed into, a passive mode when the active mode experiences a failure. For instructional purposes, the suspension system 10 failures may be generally of three types. In a first type of active mode failure, the suspension system 10 is directed into the passive mode when there is a loss of pressurized fluid communication between the fluid providing unit 14 and a suspension unit 15a, for example when the pump 28 malfunctions or the fluid conduit 22 is severed. If a suspension unit 15a experiences a loss in pressurized fluid communication with the pump 28, the central processing unit 12 reports this information to the corner processing unit 16a for that particular suspension unit 15a. In response, the corner processing unit 16a commands the valve controller 40 to de-actuate the protection valve 32, the power valve 34, and the by-pass valve 36. The protection valve 32 and the power valve 34 disconnect the fluid providing unit 14 from the suspension unit 15a, trapping the remaining fluid in the suspension unit 15a. In this state, the suspension unit 15a is fluidly isolated from the remaining elements of the suspension system 10. The by-pass valve 36 then provides fluid communication between the chambers 38a and 38b of the cylinder 38. In this state, the suspension unit 15a is operating in the passive mode as a passive suspension.

When the by-pass valve 36 is of the direct acting type, the central processing unit 12 and/or the corner processing unit 16a may adjust the amount of fluid resistance provided by the by-pass valve 36. The central processing unit 12 calculates the suspension unit command in response to body motion and vehicle operator inputs, for example, the initiation of a turn. The corner processing unit 16a utilizes information from position transducer 44, pressure sensor 46, pressure sensor 48, and pressure transducer 50 to calculate the valve position desired so that the desired force is generated in response to commands from the central processing unit 12. The valve controller 40, in response to commands from the corner processing unit 16a, then adjusts the position of the by-pass valve spool inside the bushing of the by-pass valve 36 thereby adjusting the amount of fluid restriction between the chambers 38a and 38b of cylinder 38.

In a second type of active mode failure, the suspension unit 15a reverts into a passive mode when there is an electrical power failure or the protection valve 32 and/or power valve 34 malfunction. If the suspension system 10 or the central processing unit 12 or a suspension unit 15a experiences an electrical power failure, the protection valve 32, the power valve 34, and the by-pass valve 36 automatically revert to their unactuated states. Under these circumstances the suspension unit 15a is fluidly isolated from the remaining elements of the suspension system 10. As before, the protection valve 32 disconnects the fluid providing unit 14 from the suspension unit 15a, trapping the remaining fluid in the suspension unit 15a. The by-pass valve 36 then provides fluid communication between the chambers 38a and 38b of the cylinder 38. In this state, the suspension unit 15a again functions as a passive suspension.

In a third type of active mode failure, the suspension unit 15a also reverts into a passive mode when the corner processing unit 16a malfunctions. If the corner processing unit 16a experiences a malfunction, the retrigerable monostable multivibrator unit 41 is not triggered or retriggered at the sufficient frequency by the corner processing unit 16a. This causes the protection valve 32 to automatically close, revert to its unactuated state. Once again, the suspension unit 15a is fluidly isolated from the remaining elements of the suspension system 10. The protection valve 32 disconnects the fluid providing unit 14 from the suspension unit 15a, trapping the remaining fluid in the suspension unit 15a. The by-pass valve 36 then provides fluid communication between the chambers 38a and 38b of the cylinder 38. In this state, the suspension unit 15a functions as a passive suspension.

In a preferred embodiment, system 10 uses the by-pass valve 36 in both the active and passive modes. The system 10, however, may use the by-pass valve 36 in the passive mode only.

Referring now to FIG. 3, in another preferred embodiment, force exerting unit 18a includes a protection valve 32, a power valve 34, a by-pass valve 36, a valve controller 40, a retriggerable monostable multivibrator unit 41, a protection actuating valve 72, and a cylinder 38. It should be noted that the power valve 34, the by-pass valve 36, the valve controller 40, and the retrigerable monostable multivibrator unit 41 function substantially similar to the elements having the identical drawing reference characters in FIG. 2. These elements were discussed in detail above and therefore will not be discussed in detail below. Further, the position transducer 44, the pressure transducer 50, and the single acting pneumatic actuator 52 are not illustrated in FIG. 3 but still remain part of the force exerting unit 18a.

In this preferred embodiment, the protection valve 32 is a pressure actuated valve and in its actuated state, couples the fluid conduit 70a to conduit 22a to provide fluid communication between the fluid providing unit 14 and the remaining elements of the force exerting unit 18a. The protection valve 32, in its unactuated state, uncouples the fluid conduit 70a from conduit 22a to interrupt fluid communication between the suspension unit 15a and the fluid providing unit 14 thereby isolating the suspension unit 15a.

The protection valve 32 is switched between states by an actuating pressure switching mechanism 32a. The actuating pressure switching mechanism 32a, for example a pilot valve switching mechanism, switches the protection valve 32 between states by adjusting the pressure of the fluid in the fluid conduit 74a. The pressure necessary to cause the switching mechanism 32a to actuate the protection valve 32 depends upon the pressure sensitivity "rating" of the switching mechanism 32a. In a preferred embodiment, when the substantially constant pressurized fluid is maintained at about 2500 psi in the fluid conduit 22, the switching mechanism 32a switches the protection valve 32 between states at a fluid pressure of about 750 psi.

The protection actuating valve 72 is a 3-port electronically controlled valve. The protection actuating valve 72 is a two state device and in its actuated state, couples the fluid conduit 22a to the conduit 74a. The protection actuating valve 72, in its unactuated state, uncouples the fluid conduit $22a_1$ from the conduit 70a, and couples the fluid conduit $22a_2$ to the conduit 74a.

When the protection actuating valve 72 is in its actuated state, the protection valve 32 is actuated provided there is sufficient fluid pressure in fluid conduit $22a_1$. When the protection actuating valve 72 is in its unactuated state, the protection valve 32 is forced into an unactuated state thereby fluidly isolating the suspension unit 15a. The protection actuating valve 72 is responsive to signals from the retriggerable -monostable multivibrator unit 41 over the wire 41a.

In operation, when there is a loss of fluid pressure in fluid conduit $22a_1$, the protection valve 32 automatically reverts into its unactuated state. As mentioned above, when the protection valve 32 is in the unactuated state, the suspension unit 15a is fluidly isolated from the remaining elements of the suspension system 10 and functions as a passive suspension.

The protection valve 32 also automatically reverts into its unactuated state when the system 10 experiences a loss of electrical power. Under these conditions, the protection actuating valve 72 reverts into its unactuated state and the fluid conduit 74a is coupled to the fluid conduit $22a_2$ thereby causing protection valve 32 to deactuate. The power valve 34 and the by-pass valve 36 function as disclosed in detail above.

Further, the suspension unit 15a reverts into a passive mode when the corner processing unit 16a malfunctions, or for other reasons, fails to trigger or retrigger the retriggerable monostable multivibrator unit 41 at a sufficient frequency. This causes the protection actuating valve 72 to automatically de-actuate and revert to its unactuated state. Under these conditions, the fluid conduit 74a is coupled to the fluid conduit $22a_2$ thereby causing the protection valve 32 to revert to its unactuated state. Once again, the suspension unit 15a is fluidly isolated from the remaining elements of the suspension system 10. The protection valve 32 disconnects the fluid providing unit 14 from the suspension unit 15a, trapping the remaining fluid in the suspension unit 15a. The by-pass valve 36 then provides fluid communication between the chambers 38a and 38b of functions as a passive suspension.

The suspension unit 15a can be commanded into a passive suspension mode. The corner processing unit 16a commands the valve controller 40 to de-actuate the protection actuating valve 72 and the by-pass valve 36. The protection actuating valve 72 disconnects the fluid conduit $22a_1$ from the fluid conduit 74a causing protection valve 32 to de-actuate and fluidly isolate the suspension unit 15a from the remaining elements of the suspension system 10. The by-pass valve 36 then provides fluid communication between the chambers 38a and 38b of the cylinder 38. In this state, the suspension unit 15a is operating in the passive mode.

It should be noted that in the embodiments above, the power valve 34 and the by-pass valve 36 are described as electronically controlled valves. These are generally two stage valves well known to those skilled in the art. An electrical signal controls a first stage which then causes the valve spool in the second stage to move into the desired position. It should be noted that direct acting voice coil valves may be employed in applications which can accommodate larger valves.

Various preferred embodiments of the present invention have been described. It is understood, however, that changes and modifications can be made without departing from the true scope and spirit of the present invention as defined by the following claims, which are to be interpreted in view of the foregoing.

What is claimed is:

1. A vehicle suspension system having active and passive modes comprising, in combination, a pump for producing pressurized fluid, a cylinder supporting a moveable piston and defining first and second chambers on opposing sides of said piston, a fluid supply conduit for supplying pressurized fluid from said pump to said cylinder, an electrically controllable protection valve coupled between said cylinder and said supply conduit, said protection valve being positionable in a first state for coupling said conduit to said cylinder and in a second state for preventing fluid flow between said cylinder and said conduit, an electrically controllable by-pass valve connected in fluid flow relation between said first and said second chambers of said cylinder, said by-pass valve providing a controllable resistance to fluid flow between said chambers, an electrically controlled servo valve connected in fluid flow relation between said protection valve and said cylinder for controlling the relative pressure applied to said first and chambers, a plurality of condition-responsive sensors, and a processor responsive to said sensors for generating electrical control signals which are applied to said protection valve, said by-pass valve and said servo valve to establish said active and said passive modes, said control signals in said active mode positioning said protection valve in said first state and controlling the level of flow through said servo valve and said by-pass valve in response to conditions detected by said sensors, and said control signals in said passive mode positioning said protection valve in said second state, and placing said by-pass valve and said servo valve in predetermined states.

2. A vehicle suspension system as set forth in claim 1 wherein said processor and at least one of said sensors is responsive to a loss of fluid pressure supplied to said cylinder via said supply conduit for generating control signals to establish said passive mode.

3. A vehicle suspension system as set forth in claim 2 including means for monitoring the control signals supplied by said processor and for placing said protection valve in said second state whenever said processor fails to supply control signals meeting predetermined conditions.

4. A vehicle suspension system as set forth in claim 2 wherein each of said valves is responsive to a loss of electrical operating power to place said system in said passive mode.

* * * * *